Feb. 16, 1971  A. E. EDELMAN  3,562,912
APPLIANCE FOR INSERTING DENTAL IMPLANTS
Filed July 7, 1969  2 Sheets-Sheet 1
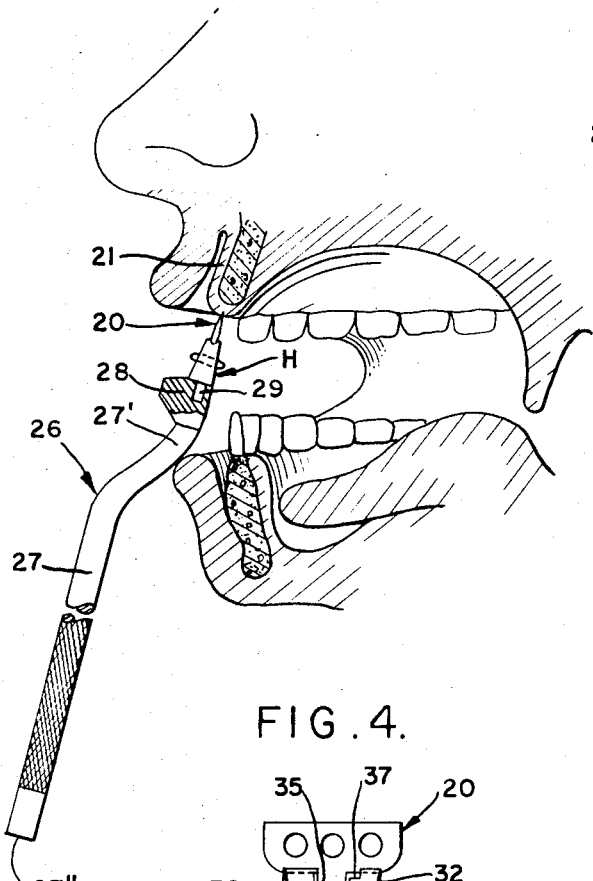
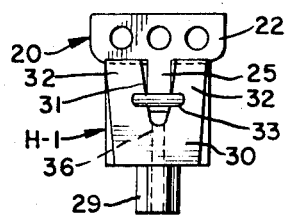
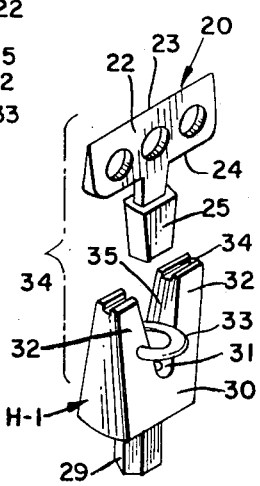
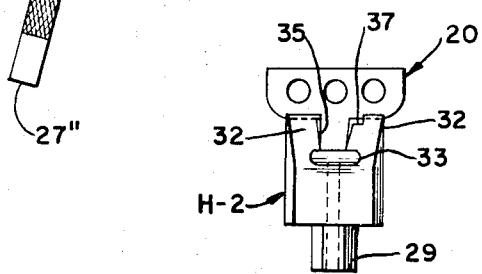
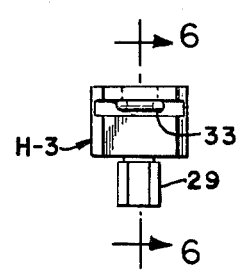
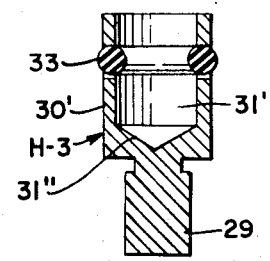
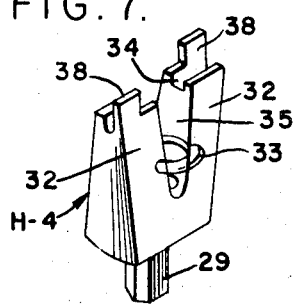
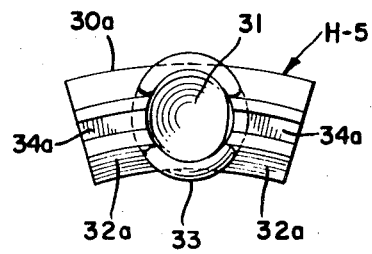
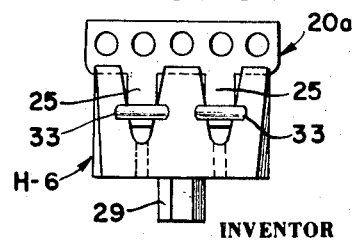
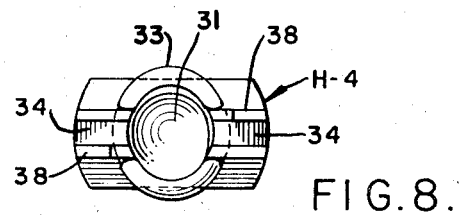
INVENTOR
ALFRED E. EDELMAN
BY Munson H. Lane
ATTORNEY

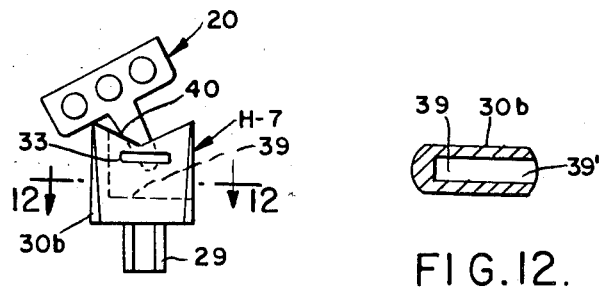
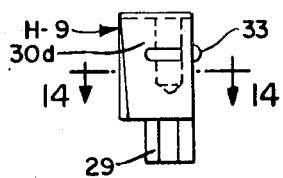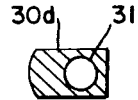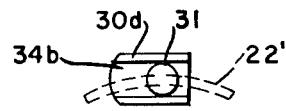
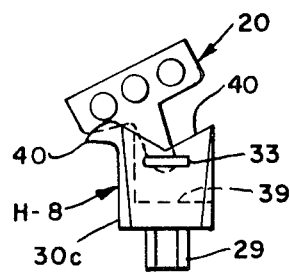

United States Patent Office 3,562,912
Patented Feb. 16, 1971

3,562,912
APPLIANCE FOR INSERTING DENTAL IMPLANTS
Alfred E. Edelman, 2723 Federal St.,
Camden, N.J. 08105
Filed July 7, 1969, Ser. No. 839,377
Int. Cl. A61c 3/00
U.S. Cl. 32—40
10 Claims

ABSTRACT OF THE DISCLOSURE

An elongated handle is provided at one end thereof with a removable head for supporting and driving a dental implant into a patient's jaw bone by impacts delivered to the handle. A variety of heads are disclosed for selective use with the same handle at different stages of the implant inserting procedure, and also for supporting the implant in line with or angularly offset to the direction of impact, as dictated by limitations of space. Resilient means in the head frictionally retain the implant in its operative position.

---

This invention relates to new and useful improvements in instruments for use in dental surgery, and in particular the invention concerns itself with an appliance which may be effectively employed for inserting or driving dental implants into the jaw bone of a patient so that subsequent to their installation, such implants may be used as anchorage for artificial teeth and the like.

As such, the implement of the invention is especially adapted for impact insertion or driving of wide vent dental implants of the general type disclosed in patent application Ser. No. 804,738 filed Feb. 24, 1969 by Leonard I. Linkow and Alfred E. Edelman, which type of implant is characterized in that it has a wide blade portion which is impact-driven into the jaw bone and is provided with a head portion projecting out of the jaw for anchorage purposes. However, it is to be understood that the implement of the invention may be used generally for the insertion of endosseous type implants of other similar characteristics.

The principal object of the invention is to provide a simple and effectively usable appliance whereby a dental implant may be conveniently supported and driven into a patient's jaw bone by impacts delivered to the appliance, as by a hammer or other suitable means, the appliance being so constructed and arranged as to facilitate its use in poorly accessible regions of the mouth, and also to permit the implant inserting procedure to be performed in separate successive stages by the use of a plurality of interchangeable, appropriately shaped implant engaging heads on a common handle of the appliance. Moreover, the appliance facilitates the use of differently constructed heads which are best suited from the standpoint of impact delivery in different implant inserting operations with regard to the direction of impact under variously restricted space conditions.

With the foregoing more important object and features in view and such other objects and features which may become apparent as this specification proceeds, the invention will be understood from the following description taken in conjunction with the accompanying drawings, wherein like characters of reference are used to designate like parts, and wherein:

FIG. 1 is a view, partly in elevation and partly in vertical section, showing the appliance of the invention supporting a dental implant in readiness for impact-driving of the implant into the jaw bone of a patient;

FIG. 2 is an enlarged elevational view showing the implant supported in one embodiment of the appliance head;

FIG. 3 is a group perspective view of the implant and appliance head shown in FIG. 2;

FIG. 4 is an elevational view showing the implant engaged by a second embodiment of the appliance head;

FIG. 5 is an elevational view of a third embodiment of the head;

FIG. 6 is an enlarged sectional view taken substantially in the plane of the line 6—6 of FIG. 5;

FIG. 7 is a perspective view showing another modified form of the appliance head;

FIG. 8 is an enlarged plan view of the head shown in FIG. 7;

FIG. 9 is a plan view showing another head modification;

FIG. 10 is an elevational view of another modified form of the head used with an implant having a plurality of head portions;

FIG. 11 is an elevational view of an implant supported by another modified form of the head;

FIG. 12 is a cross-sectional view taken in the plane of the line 12—12 in FIG. 11;

FIG. 13 is an elevational view of another embodiment of the head;

FIG. 14 is a cross-sectional view taken in the plane of the line 14—14 in FIG. 13;

FIG. 15 is a plan view of the head of FIGS. 13 and 14 applied to a curved implant; and FIG. 16 is an elevational view of the implant supported by another modified form of the head.

Referring now to the accompanying drawings in detail, attention is first drawn to the upper portion of FIG. 3 which shows a wide vent dental implant 20 of the general type disclosed in the aforesaid patent application Ser. No. 804,738 in that the implant is adapted to be impact-driven into the jaw bone 21 of a patient as will be apparent from the illustration in FIG. 1. Basically, the implant 20 comprises a wide blade portion 22 which has one sharpened edge 23 for driving into the jaw bone, while its opposite longitudinal edge 24 is provided integrally with a polygonal head portion 25 which projects outwardly from the jaw after the implant is inserted and which provides anchoring means for an artificial tooth, or the like.

The present invention concerns itself with the provision of an appliance, designated generally as 26 in FIG. 1, whereby the dental implant 20 may be supported and its blade portion 22 impact-driven into the jaw bone 21 in a simple and expeditious manner notwithstanding the obviously restricted work region in which the operation is undertaken.

The appliance 26 comprises two primary components, namely, an elongated, rod-shaped handle 27, one end portion of which is provided with an open-ended recess 28 for removable reception of a mounting stud 29 formed integrally with the body of an interchangeable, selectively usable head H. Numerous embodiments of the head H are disclosed for selective use with the common handle 27, and to the extent that such embodiments of the head are structurally different, they will hereinafter be referred to as H–1, H–2, H–3, et cetera.

For the time being it is to be noted that the end portion 27′ of the handle 27, that is, the end portion on which the head H is removably mounted, is offset laterally from the longitudinal axis of the main portion of the handle, so that the head-equipped offset end portion of the handle may be conveniently applied to the jaw, even in poorly accessible locations, without interfering with the adjacent regions of the patient's mouth, as exemplified in FIG. 1. It is to be also noted that the handle socket or recess 28 and the mounting stud 29 of the head H are of a complemental, polygonal cross-section, so that the head H may be removably applied to the handle portion 27′ in a selected angular relationship to the axis of that handle portion, while preventing rotation of the head about that axis.

The various modified embodiments of the head H will now be described, commencing with the embodiments H–1, H–2 and H–3 of FIGS. 2–3, 4 and 5–6, respectively, which are intended to be used successively during insertion of one implant 20 in the jaw bone 21. The first embodiment H–1, shown in FIGS. 2 and 3, is primarily intended to be used in the initial stage of the operation for driving the implant into the jaw bone, while the implant is supported by the head H–1, the head is mounted on the end portion 27' of the handle 27, and the opposite or outer end 27" of the handle is impacted, as by a hammer or by a suitable power driven impacting tool.

The implement head H–1 comprises a body portion 30 which is integral with the mounting stud 29 and abuts the end of the handle position 27' when the mounting stud is inserted into the recess 28. The body portion or head body 30 is provided with a central socket 31 for reception of the head portion 25 of the implant 20, and portions of the body 30 at the opposite sides of the socket 31 constitute a pair of wings 32 which are substantially coplanar with and disposed adjacent to the blade portion 22 of the implant 20. The socket 31 in the head body 30 is equipped with a resilient ring 33 which is frictionally engageable with the head portion 25 of the implant and serves to frictionally hold the implant in position on the body 30. The outer ends of the wings 32 are formed with aligned grooves 34 which afford seats for the blade portion 22 of the implant, and since in this manner the wings 32 abuttingly engage the implant blade portion, it will be apparent that impacts imparted to the end 27" of the handle 27 will be transmitted through the head H–1 to the implant blade portion, whereby to drive the latter into the jaw bone. It will be also understood that since the implant blade portion 22 is seated in the grooves 34 of the head body 30, relative rotation of the implant about the axis of the socket 31 in the head body will not be possible. Thus, the implant will be firmly supported by the implement in readiness for driving into the jaw bone by impacts on the implement handle, in the initial stage of the implant inserting procedure.

The wings 32 are spaced apart transversely of the head body 30 and afford therebetween an open-sided space 35 through which the head portion 25 of the implant 20 extends into the socket 31, as will be apparent from FIG. 2, and the aforementioned resilient ring 33 is conveniently mounted in the wings 32 so that it bridges the open space 35 in the head body 30 and is thus effectively capable of frictionally engaging the head portion 25 of the implant.

The already described initial stage of the implant inserting procedure serves to enter the blade portion 22 of the implant into a patient's jaw bone, and when this is accomplished the appliance is removed from the implant so that only the latter remains in the patient's mouth. Removal of the appliance from the implant is, of course, facilitated by the removable reception of the implant head portion 25 in the socket 31 of the head body 30, and in the event that any difficulty should be experienced in separating these parts, the entire handle 27 may be separated from the head H–1 while the latter still remains connected to the implant. An open-ended bore 36 is preferably provided through the mounting stud 29 and through the head body 30 in communication with the socket 31, so that a suitable tool such as a wire rod, or the like, may be passed through the bore 36 to assist in removal of the head H–1 from the implant portion 25.

In any event, after the head H–1 has been removed, a second head H–2 is applied to the handle 27 for carrying out the second stage of the operation which involves properly aligning the implant in the jaw bone. The head H–2 is of the same construction as the head H–1 except that one of the wings 32 is provided at its inner side with a cut-out portion 37 as shown in FIG. 4, this cut-out portion opening into the aforementioned space 35 and serving as a window to facilitate sighting through the device and proper alignment of the implant in the jaw bone, notwithstanding the fact that the space 35 itself is obstructed by the presence of the implant portion 25.

After the implant has been properly aligned in the jaw bone, the third final stage of the procedure is carried out by substituting the head H–3 of FIGS. 5–6 for the head H–2, the head H–3 being used to finally set the implant in the jaw bone. As such the head H–3 has a body 30' which is proportioned in relation to the implant 20 so that when the head portion 25 of the implant is inserted into the socket 31', it comes into abutment with the closed inner end 31" of the socket while the outer end of the head body is spaced away from the blade portion 22 of the implant. Thus, impacts delivered to the handle 27 are transmitted directly to the head portion 25 of the implant, rather than to the blade portion 22 thereof as is done when using the head H–1 or H–2, so that during this final setting of the implant the head H–3 does not come in contact with the patient's jaw.

The remaining figures in the drawings show various other modified heads which under different operating conditions may be selectively used with the same handle 27. Thus, for example, FIGS. 7–8 show a head H–4 which is quite similar to the head H–1, but its wings 32 are provided with projections 38 which are disposed at the respective opposite sides of the grooves 34 and permit the head to be used in conjunction with an implant which has a longitudinally curved blade portion instead of a flat or straight blade portion such as the portion 22. In the same context, another modified head H–5 is shown in FIG. 9, the head body 30a of which, as well as the wings 32a and the wing grooves 34a are curved to accommodate the curvature of an implant with a curved blade portion.

FIG. 10 shows a head H–6, similar in construction to the head H–1, for example, but arranged to accommodate a relatively long implant which has a plurality of head portions 25, as for example the implant 20a, and for this purpose the head H–6 is formed with a plurality of sockets for reception of the several head portions of the implant.

Another modified head H–7 is illustrated in FIGS. 11–12 wherein the head body 30b is provided with a cavity 39, instead of the socket 31, for receiving the head portion 25 of the implant, the cavity 39 being open at one side of the head body as indicated at 39' in FIG. 12 so that when the implant is applied to the head, it may assume an angular position rather than a normal position with respect to the head, for example as shown in FIG. 11. The head body 30b is notched as at 40 and this notching provides the head body with angularly disposed surfaces for seating against the blade portion of the implant in situations where it may be undesirable or impossible to insert the implant with the head portion of the implant being axially aligned with the mounting stud 29. A similar arrangement also exists in the head H–8 of FIG. 16 where the head body 30c is provided at one side thereof with a curved extension 40 as a further facility for accommodating the implant in an angularly disposed position.

FIGS. 13–15 show a head H–9 in which the socket 31 is aligned with the mounting stud 29 but wherein the head body 30d is offset to one side of the socket and mounting stud axis for use in certain poorly accessible areas of the mouth. Also, the head body 30d is provided with a relatively wide groove 34b in order to accommodate implants with a curved blade portion, as indicated by the dotted lines 22', while preventing the blade portion from becoming displaced from the groove.

What is claimed as new is:

1. An appliance for inserting in the jaw a wide vent dental implant which includes a blade portion and a head portion projecting from one edge of the blade portion, said appliance comprising an elongated handle provided in one end thereof with a recess, and an implant receiving head removably mounted on said one end of said handle, said head comprising a mounting stud removably positioned in said recess and a head body on said mounting stud, said head body being provided with a socket adapted to receive the head portion of an implant and including a pair of wing portions disposed at opposite sides of said socket adjacent the blade portion of the implant.

2. The appliance as defined in claim 1 wherein said one end portion of said handle provided with said recess is laterally offset from the main longitudinal axis of said handle.

3. The appliance as defined in claim 1 together with resilient means provided in said head body for frictionally retaining the head portion of an implant in said socket.

4. The appliance as defined in claim 1 which is further characterized in that the recess in said handle and said mounting stud of said head are of a complementally polygonal cross-section whereby said head may be angularly adjustably but non-rotatably mounted on said handle.

5. The appliance as defined in claim 1 which is further characterized in that said wing portions of said head body abuttingly engage the blade portion of an implant for transferring impact forces thereto.

6. The appliance as defined in claim 5 wherein said wing portions are provided with grooves for seating and abuttingly engaging the blade portion of an implant.

7. The appliance as defined in claim 5 which is further characterized in that said wing portions are spaced apart transversely of said head body and afford therebetween an open-sided space through which the head portion of an implant is adapted to extend into said socket.

8. The appliance as defined in claim 1 which is further characterized in that said socket in said head body has a closed inner end for abutting engagement with the head portion of an implant and transferring impact forces thereto while said wing portions are spaced away from the blade portion of the implant.

9. The appliance as defined in claim 1 which is further characterized in that said wing portions of said head body are provided with seating surfaces normal to the axis of said socket for abuttingly engaging the blade portion of an implant and transferring impact forces thereto in a direction parallel to the socket axis.

10. The appliance as defined in claim 1 which is further characterized in that said wing portions of said head body are provided with seating surfaces angularly offset from the axis of said socket for abuttingly engaging the blade portion of an implant and transferring impact forces thereto in a direction angularly offset from the socket axis.

References Cited

UNITED STATES PATENTS 2,629,172  2/1953  Keiger _____ 32—63

ROBERT PESHOCK, Primary Examiner